(12) United States Patent
Bohringer

(10) Patent No.: US 7,759,274 B1
(45) Date of Patent: Jul. 20, 2010

(54) SUPPORT MATERIAL COMPRISING CATALYTICALLY ACTIVE POLYMER PARTICLES

(75) Inventor: Bertram Bohringer, Wuppertal (DE)

(73) Assignee: Blucher GmbH, Erkrath (DE)

( * ) Notice: Subject to any disclaimer, the term of this patent is extended or adjusted under 35 U.S.C. 154(b) by 618 days.

(21) Appl. No.: 11/475,669

(22) Filed: Jun. 27, 2006

(30) Foreign Application Priority Data

Jun. 28, 2005 (DE) .................. 10 2005 030 461
Aug. 25, 2005 (DE) .................. 10 2005 040 189

(51) Int. Cl.
*B01J 31/06* (2006.01)
*B01J 31/00* (2006.01)

(52) U.S. Cl. ...................................... 502/150

(58) Field of Classification Search .............. 502/150
See application file for complete search history.

(56) References Cited

U.S. PATENT DOCUMENTS

| 7,256,156 B2 | 8/2007 | Axtell et al. | 502/417 |
| 7,268,269 B2 | 9/2007 | Axtell et al. | 588/299 |
| 2003/0013369 A1 | 1/2003 | Soane et al. | |
| 2003/0038083 A1* | 2/2003 | Schiestel et al. | 210/660 |
| 2004/0009726 A1* | 1/2004 | Axtell et al. | 442/123 |

FOREIGN PATENT DOCUMENTS

| DE | 100 13 670 A1 | 3/2000 |
| JP | 2005-518279 | 6/2005 |
| WO | WO 03/072498 A1 | 9/2003 |
| WO | WO 03/104534 A2 | 12/2003 |

OTHER PUBLICATIONS

Popall, et al. 1998 Electronic Components and Technology Conference, 1018-1025.*
McCullough et al. "A comparison of standard methods for measuring water vapour permeability of fabrics" in *Meas. Sci. Technology* [Measurements Science and Technology] 14, 1402-1408, Aug. 2003, pp. 1402-1408.
DIN EN 31 092: 1993 of Feb. 1994 ("Textiles—Physiological Effects, Measurement of Heat and Water Vapor Transmission Resistance under steady state Conditions [sweating guarded-hotplate test]", 9 pgs.

* cited by examiner

*Primary Examiner*—Melvin C Mayes
*Assistant Examiner*—Yun Qian
(74) *Attorney, Agent, or Firm*—Woodard, Emhardt, Moriarty, McNett & Henry LLP

(57) ABSTRACT

The invention relates to a catalytically active unit comprising a support material, wherein the catalytically active unit and/or the support material comprises polymeric particles, in particular polymeric nanoparticles, and/or wherein the support material is provided with polymeric particles, in particular polymeric nanoparticles, the polymeric particles comprising at least one catalytically active component. The catalytically active unit of the present invention is particularly useful for removing noxiant, odorant and poisonous entities of any kind, in particular from air and/or gas streams, and for protecting against chemical poisonous entities, in particular warfare agents, for example in NBC protective materials (for example protective clothing).

16 Claims, No Drawings

SUPPORT MATERIAL COMPRISING CATALYTICALLY ACTIVE POLYMER PARTICLES

CROSS-REFERENCES TO RELATED APPLICATIONS

This application claims priority to German Patent Application No. DE 10 2005 030 461.3, filed Jun. 28, 2005, and also claims priority to German Patent Application No. DE 10 2005 040 189.9, filed Aug. 25, 2005, entitled "SUPPORT MATERIAL COMPRISING CATALYTICALLY ACTIVE POLYMER PARTICLES". Both references are expressly incorporated by reference herein, in their entirety.

BACKGROUND OF THE INVENTION

The present invention relates to a catalytically active unit or entity, said unit or entity comprising a support material (synonymously also called "backing material") comprising catalytically active polymeric particles, particularly nanoparticles, and to the use thereof, particularly for civil and military application, for example in the sector of NBC protection, of air purification, of filter applications and the like. The present invention further relates to protective materials of any kind which are produced using the catalytically active unit of the present invention. The present invention finally relates to filters and filtering materials produced using, or comprising, the catalytically active unit of the present invention.

BRIEF SUMMARY OF THE INVENTION

A catalytically active unit is disclosed wherein the catalytically active unit comprises a support material, the support material being provided with polymeric nanoparticles, the polymeric nanoparticles comprising at least one catalytically active component.

One object of the present invention is to provide an improved catalytically active unit for NBC protection, air purification, and other filtering applications.

Related objects and advantages of the present invention will be apparent from the following description.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

There are a series of entities which are absorbed by the skin and lead to serious physical harm or noxiae. Examples are chemical warfare agents, for example the vesicatory Hd (yellow cross) and the nerve gas sarin. People likely to come into contact with such poisons need to wear a suitable protective outfit or be protected against these poisons by suitable protective material.

With regard to air purification or the providing or treatment of air, gases or gas mixtures, for example to create a better indoor atmosphere or to create clean air, particularly including for the industrial sector, the impact on the environment due to noxiants has become more and more of a public issue through a steadily increasing environmental awareness and also through high-sensitivity analytical methods. Increasing industrialization, moreover, has led to substantial pollution of the atmosphere. Any kind of combustion, for example in power stations, in automotive engines, due to heating, etc, leads to unwanted products of combustion, particularly to oxidized carbonaceous compounds, nitrogen oxides, incompletely burnt hydrocarbons and the like. In addition, there are noxiant exposures due to contaminated rooms in which noxiant-contaminated materials have been installed (for example PCB-contaminated building materials etc). Similarly, poisonous entities can be released by furniture, wall paints, carpet adhesives and the like.

There is accordingly altogether a substantial need for removing various kinds of air-polluting substances, in particular harmful or troublesome noxiant, poison or odorant entities, from the air. There are a number of processes in the prior art for removing such substances. Mechanical filtering processes, conversion or decomposition of the troublesome or harmful substances and also absorptive and adsorptive processes may be mentioned by way of example.

Adsorptive processes utilize filtering units having an adsorptive action. The problem here is often that prior art filtering units do not always provide an adequate adsorptive capacity, which is relatively rapidly exhausted, so that the filtering materials have to be replaced in order that breakthroughs may be avoided. Often, moreover, adsorptive performance is inadequate.

The present invention thus has for its object to provide a catalytically active unit which at least partially avoids or at least ameliorates the above-described disadvantages of the prior art. More particularly, such a catalytically active unit should be capable by virtue of its catalytic activity of removing or catalytically decomposing particularly noxiant, odorant and poisonous entities of any kind, including chemical and biological poison and warfare agents, composed for example of air, gases or gas mixtures, while at least essentially avoiding any exhaustion of the catalytically active unit. Furthermore, the catalytically active unit shall be suitable for use in the realm of the manufacture of protective materials of any kind, for example protective suits and the like, with protective suits in particular providing the wearer with effective protection particularly to noxiant, odorant or poisonous entities of any kind, such as chemical poison or warfare agents, while at the same time ensuring high wear comfort.

It is a further object of the present invention to provide a catalytically active unit equally useful for purifying or cleaning air, gases or gas mixtures. The catalytically active unit shall be particularly useful for producing high-purity air or for removing gas, odorant or poisonous entities from air or gas streams, for example in venting installations, ventilation systems, air conditioners or the like. More particularly, the catalytically active unit shall be useful in the realm of the manufacture of filters and filtering materials of any kind, such as NBC protective mask filters, odor filters, sheet filters, air filters and the like.

It is yet a further object of the present invention to provide protective materials of any kind, in particular protective clothing, such as protective suits and the like, in particular for the civilian or military sector, that contains or consists of the catalytically active unit of the present invention.

It is finally a further object of the present invention to provide filters and filtering materials of any kind, in particular for removing noxiant, odorant and poisonous entities of any kind, in particular from air and/or gas streams, such as NBC protective mask filters, odor filters, sheet filters, air filters and the like, that include or consist of the catalytically active sheet-like unit of the present invention.

The problem underlying the present invention is solved by a catalytically active unit according to the claims and the specification and also its use for manufacturing protective materials or for manufacturing filters and filtering materials as defined in the claims and specification. The problem underlying the present invention is further solved by the protective materials as defined in the claims and specification, which include the catalytic unit of the present invention, and also by filters and filtering materials as defined in the claims and specification, which comprise the catalytically active unit of the present invention. Further, advantageous embodiments form the subject-matter of the respective sub-claims.

Accordingly, the present invention—according to a first aspect of the present invention—relates to a catalytically active unit comprising a support material (synonymously also named as a "backing material" or "carrier material"), wherein the catalytically active unit and/or the support material comprise(s) polymeric particles, in particular polymeric nanoparticles, and/or wherein the support material (backing material) is provided with polymeric particles, in particular polymeric nanoparticles, said polymeric particles comprising at least one catalytically active component.

In other words, one special feature of the catalytically active unit of the present invention is that it has catalytic properties and thus is useful for eliminating or removing noxiant, odorant and poisonous entities of any kind, in particular from air or gas to streams, on the basis of catalytic processes of decomposition. This is achieved in accordance with the present invention when the catalytically active unit, in particular the support material (backing material), comprises polymeric particles, in particular polymeric nanoparticles, comprising at least one catalytically active component (i.e. a catalyst).

The support material (backing material) for receiving the polymeric particles is preferably a flat or flat-shaped (i.e. sheet-like) or at least essentially two-dimensional construction. In other words, the support material (backing material) used in accordance with the present invention is preferably a fabric.

In an embodiment which is particularly preferred in accordance with the present invention, the support material (backing material) used in accordance with the present invention is a textile fabric. Nonlimiting examples are textile woven fabrics, textile loop-formingly knitted fabrics, textile loop-drawingly knitted fabrics, textile laid fabrics, textile composite fabrics, such as batts and the like. But it is similarly conceivable in accordance with the present invention for the support material (backing material) to be a nonwoven.

The basis weight of the support material (backing material) should be in the range from 25 to 500 g/m$^2$, in particular in the range from 30 to 250 g/m$^2$ and preferably in the range from 35 to 200 g/m$^2$. The choice of basis weight depends on the particular use intended for the catalytically active unit of the present invention. For protective suits for example it is preferable to employ high basis weights, in particular when the catalytically active unit is employed as sole material. A person skilled in the art is at all times capable of conforming the corresponding basis weights to the particular use.

In a first embodiment of the catalytic unit of the present invention—in particular for ensuring a high air throughput rate of the kind desirable in the case of filters or filtering materials for example—the support material (backing material) used in accordance with the present invention may preferably be gas pervious, in particular air pervious. The support material (backing material) in accordance with this embodiment may further be water pervious and/or water vapor pervious. This embodiment of the present invention is preferable particularly when the catalytically active unit of the present invention is used in the realm of filters and filtering units, since they are intended to clean or purify gases or air at high throughput rates. The first embodiment's air perviousness of the catalytically active unit of the present invention should equal a DIN 53887 air transmission rate of more than 200 l/m$^2$ per second, preferably more than 300 l/m$^2$ per second, more preferably more than 400 l/m$^2$ per second, even more preferably more than 600 l/m$^2$ per second and most preferably more than 800 l/m$^2$ per second. A high air perviousness is advantageous in particular because the flow of gases or air around or through the catalytically active unit of the present invention can be particularly effective, so that in particular with regard to the use as a filter or filtering material high throughput rates and hence a high catalytic performance can be achieved.

In an alternative, second embodiment, the support material (backing material) as such may be gas impervious, in particular air impervious and/or water impervious, in which case the support material (backing material) of this embodiment is preferably water vapor pervious. This embodiment is contemplated in particular for use of the catalytically active unit of the present invention for protective materials for example, in particular for protective suits of any kind, since the gas or air imperviousness on the one hand and the water imperviousness on the other provide an additional protection against warfare agents or poisons while finally the water vapor perviousness ensures a high wear comfort. To ensure for example high wear comfort—in particular when the catalytically active unit of the present invention is used in or as protective materials—the catalytically active unit of the present invention may have at 25° C. a water vapor transmission rate of at least 15 l/m$^2$ per 24 h, in particular 20 l/m$^2$ per 24 h, preferably at least 25 l/m$^2$ per 24 h, more preferably at least 30 l/m$^2$ per 24 h or even more (measured by the "Inverted Cup Method" of ASTM E 96 and at 25° C.) (for further details concerning the measurement of Water Vapor Transmission Rate, WVTR cf. also McCullough et al. "A comparison of standard methods for measuring water vapor permeability of fabrics" in *Meas. Sci. Technol. [Measurements Science and Technology]* 14, 1402-1408, August 2003). This, as stated, ensures a particularly high wear comfort.

To achieve a good wear comfort, the catalytically active unit of the present invention, for example when used in or as protective materials, for example for protective suits, may additionally have a water vapor transmission resistance $R_{et}$ under steady state conditions—measured in accordance with DIN EN 31 092:1993 of February 1994 ("Textiles—physiological effects, measurement of heat and water vapor transmission resistance under steady state conditions (sweating guarded-hotplate test)") or in accordance with the equivalent international standard ISO 11 092—at 35° C. of at most 20 (m$^2$·pascal)/watt, in particular at most 15 (m$^2$·pascal)/watt, preferably at most 10 (m$^2$·pascal)/watt, more preferably at most 7 (m$^2$·pascal)/watt.

The polymeric particles used in accordance with the present invention are preferably polymeric nanoparticles or nanoparticles containing or consisting of at least one polymer.

The diameter of the polymeric particles, in particular of the polymeric nanoparticles, can vary within wide limits. The diameter of the polymeric particles, in particular nanoparticles, used in accordance with the present invention is at least 1 nm, in particular at least 5 nm, preferably at least 10 nm, more preferably at least 75 nm and most preferably at least 100 nm; the diameter of the polymeric particles, in particular nanoparticles, is at most 1.000 nm, preferably at most 800 nm, more preferably at most 700 nm, even more preferably at most 600 nm and most preferably at most 500 nm. In other words, the polymeric particles, especially the polymeric nanoparticles, applied to the support material (backing material) in particular have a diameter in the range from 1 nm to 1.000 nm, especially in the range from 5 nm to 900 nm, preferably in the range from 10 nm to 800 nm, more preferably in the range from 50 nm to 700 nm, even more preferably in the range from 75 nm to 600 nm and most preferably in the range from 100 nm to 500 nm. The aforementioned diameter specifications are statistical mean values in the realm of the present invention; in this regard, the diameter specifications are to be understood such that at least 80%, preferably at least 85% and more preferably at least 90% of the polymeric particles used have the specified diameter value.

The polymeric particles used in accordance with the present invention are preferably nanoparticles. Nanoparticles have specific chemical and physical properties. For instance, nanoparticles can have, in comparison to the volume for example, extremely large particulate surfaces, so that these have large reactive surface areas in conjunction with a catalytically active component. This is utilized in the realm of the present invention by the nanoparticles being provided with or including a catalytically active component or catalyst.

As used herein, the term "catalytically active component" or occasionally just "catalyst" refers to one or more substances capable of inducing and/or enlisting and/or speeding the degradation, particularly due to oxidation, of, in particular, chemical and biological odorant, noxiant and poisonous entities and the like.

The unit which is reactive in accordance with the present invention is preferably configured such that the polymeric particles, in particular the polymeric nanoparticles, are durably conjoined with the support material (backing material). This can be effected for example by means of an adhesive applied, in particular, in a discontinuous and preferably dotwise manner. The support material (backing material) may be provided with the adhesive in a regular or irregular pattern or design, in which case the softness, flexibility/extensibility and air perviousness of the catalytically active unit of the present invention should be substantially preserved. But it is similarly possible with the present invention for the support material (backing material) to be endowed with a continuous coating of adhesive, in particular if an air- or water-tight configuration is desired for the catalytically active unit of the present invention.

As used herein, the term "providing" (e.g. the support material is provided with nanoparticles) is to be understood as meaning in particular that at least one side of the preferably sheet-like support material (backing material) is endowed or provided with the polymeric particles, especially the nanoparticles; moreover, it may also be provided in accordance with the present invention that both sides of the support material (backing material) are provided with the polymeric particles, especially the polymeric nanoparticles. Owing to the size of the polymeric particles, especially of the polymeric nanoparticles, it is similarly possible that the polymeric particles in the course of their application to or onto the support material penetrate at least partially into the support material (backing material), or completely pervade the support material (backing material), so that an intimate bond between the support material (backing material) on the one hand and the polymeric particles on the other can exist across the entire thickness of the support material (backing material).

As regards the providing of the support material (backing material) with the polymeric particles, the polymeric particles may in principle be conjoined with or fixed to the support material (backing material) unmediatedly (i.e. directly or in direct contact with the support material (backing material)) or else only mediatedly (i.e. indirectly or without direct contact with the support material (backing material)). Irrespective of whether the providing of the support material (backing material) with the polymeric particles is effected mediatedly or unmediatedly, it is in any event advantageous for the fixing or attachment of the polymeric particles to be ideally effected such that the polymeric particles or their surface be freely accessible for gases, in particular air and/or poisons and/or warfare agents, to an extent of at least 50%, in particular to an extent of at least 60% and preferably to an extent of at least 70% to ensure an efficient catalytic activity or performance.

As described above and as still to be described hereinbelow, in the case of unmediated or direct providing of the support material (backing material) with the polymeric particles, the binding or fixing to the support material (backing material) may be through chemical attachment etc., for example via a suitable tie-coat material, in particular a suitable adhesive, or alternatively, for example, due to their inherent tackiness.

Adhesives suitable or usable to fix the polymeric particles, in particular the polymeric nanoparticles, will be known as such to one skilled in the art. For example, thickened polymeric dispersions, hotmelt adhesives or else reactive adhesives, in particular polyurethane-based one- or two-component systems, for example blocked prepolymeric diisocyanates, which are crosslinked via di- or polyfunctional amines or alcohols, can be used. Such adhesives as are breathable in the cured state, for example polyurethane-based adhesives, are advantageous in accordance with the present invention. The amount of adhesive used can vary within wide limits. The amount can be chosen such that for example the polymeric particles or their surface are or is freely accessible for gases, in particular air and/or poisons and/or warfare agents, to an extent of at least 50%, in particular to an extent of at least 60% and preferably to an extent of at least 70% to ensure an efficient catalytic activity or performance; in other words, it should be ensured in the realm of the present invention that the polymeric particles are not completely pressed into the adhesive or do not completely sink into the adhesive.

It is similarly possible in accordance with the present invention for the polymeric particles, particularly polymeric nanoparticles, to be preferably durably conjoined with the support material (backing material) as a result of adhesion, in particular inherent adhesion or inherent tackiness. In this regard it is for example possible in accordance with the present invention for the polymeric particles or nanoparticles to be applied atop the support material (backing material) in a prepolymerized, i.e. yet to be fully crosslinked, state and for the preferably durable bonding to be realized due to the subsequent complete curing or polymerization of the polymeric particles. The providing of the support material (backing material) with the polymeric particles in accordance with this embodiment may be effected in situ for example in the course of the production of the particles or in the course of the production of the support material (backing material), in particular when the support material (backing material) is a batt.

In the case of the mediated providing of the support material (backing material) with the polymeric particles, the polymeric particles may for example be bound and/or fixed to supporting or backing structures, in particular supporting or backing particles, in which case the supporting or backing particles are in turn directly bound and/or fixed to the support material (backing material), for example by means of suitable tie-coat materials or adhesives; the providing of the supporting or backing structures with the polymeric particles may in turn be effected using customary methods, for example by contacting the supporting or backing structures with aqueous and/or organic dispersions of the polymeric particles, for example by drenching, impregnating, spraying, etc, and subsequent removal of the dispersion medium or alternatively by other methods. It should be ensured that the conjoinment of the polymeric particles with the supporting or backing structures is durable or reliable, in particular abrasion resistant. In the event that the support material (backing material) is provided with the polymeric particles via suitable supporting or backing structures, supporting or backing structures used include in particular discrete backing particles, preferably in granule form, more preferably in an at least essentially spherical shape, or alternatively in fiber form, including for example in the form of fabrics, for example wovens, formed-loop knits, laid scrims or composites; backing particles in sphere or granule form which are useful as polymeric particles have for example particle sizes of average diameters of in particular at least 0.1 mm and up to <1.0 mm, preferably <0.8 mm and more preferably <0.6 mm. In a particularly preferred embodiment of the present invention, as will be more particularly described hereinbelow, the supporting or backing structures for the polymeric particles are an adsorbent capable of adsorbing chemical poisons, in particular an adsorbent based on activated carbon, preferably in the form of activated carbon particles and/or activated carbon fibers.

The amount of polymeric particles present on and/or in the support material (backing material) can vary within wide limits. The amount of polymeric particles applied atop the support material (backing material) can be in the range from 5 to 500 g/m$^2$, in particular in the range from 10 to 400 g/m$^2$, preferably in the range from 20 to 300 g/m$^2$, more preferably in the range from 25 to 250 g/m$^2$ and even more preferably in the range from 50 to 200 g/m$^2$. If appropriate, however, departures from these values can be made depending on the planned use and if desired according to the present invention.

In accordance with the present invention, the polymeric particles may be for example ceramic nanoparticles, in particular silicate based. The ceramic nanoparticles may include organic constituents, in particular organic crosslinks and/or organic functional groups, in particular as described hereinbelow.

The polymeric particles as such may comprise at least one inorganic and/or organic polymer. In a particularly preferred embodiment, the polymeric particles comprise an inorganic-organic polymer, in particular a hybrid polymer, which is an inorganic-organic hybrid polymer produced by means of gel/sol processes.

The inorganic-organic polymer, in particular hybrid polymer, may comprise not only inorganic but also organic structural units or network constituents. More particularly, the inorganic-organic polymer, in particular hybrid polymer, may comprise an inorganic silicatic network which may if appropriate comprise organic groups, for example functional organic groups, and/or organic crosslinks.

In accordance with the present invention, the inorganic-organic polymer, in particular hybrid polymer, may comprise in particular silicon alkoxides and/or Si—O—Si units. The silicon alkoxides or Si—O—Si units may be crosslinked by hydrolysis and condensation to form an inorganic network or an inorganic network constituent or inorganic structural units; the silicon alkoxides or Si—O—Si units used for the inorganic-organic polymer, in particular hybrid polymer, may also be organically modified in a further, preferred embodiment. For example, the organically modified silicon alkoxides and the Si—O—Si units may comprise at least one organic radical (i.e. at least one organic rest or group) which is preferably bound to the silicon atom. This organic radical may be for example a polymerizable radical which is preferably selected from acryloyl groups, vinyl groups, epoxy groups and the like; these examples are nonlimiting, however; on the contrary, a multiplicity of polymerizable organic radicals, which are very well known as such to one skilled in the art, can be used in the realm of the present invention. The organic radicals of the silicon alkoxides and the Si—O—Si units may serve to form an organic network or an organic network constituent or organic structural units of the inorganic-organic hybrid polymer. To prepare the inorganic-organic hybrid polymers, this polymerization of the organic radicals can take place in a second step after the formation of the inorganic network, as will be described hereinbelow.

In accordance with the present invention, it is similarly possible in a further, alternative embodiment, for the inorganic-organic hybrid polymer to comprise silicon alkoxides or Si—O—Si units modified with functional, preferably non-polymerizable groups. In this regard, the functional, non-polymerizable group can be for example the catalytically active component used in accordance with the present invention.

But the silicon alkoxides or Si—O—Si units modified with functional, preferably non-polymerizable groups can alternatively also be present together with silicon alkoxides or Si—O—Si units provided with at least one polymerizable organic radical, in which case the non-polymerizable groups cannot contribute to the formation of the organic network, but on the contrary ensure the functionality of the inorganic-organic hybrid polymer used in accordance with the present invention—in contrast to the polymerizable groups which form the organic network.

As regards the inorganic-organic polymer or hybrid polymer, metals or heteroatoms, in particular metal alkoxides or Me—O—Me units, may preferably be present in the polymer in addition to the previously described silicon alkoxides or Si—O—Si units, in which case the metal may preferably be, nonlimitingly, copper, silver, cadmium, platinum, palladium, rhodium, zinc, mercury, titanium, zirconium and/or aluminum. In the realm of the present invention, the metals or heteroatoms, in particular the metal alkoxides, may be co-condensed with the previously specified silicon alkoxides or Si—O—Si units to produce or modify the inorganic structural units. The metals, in particular metal alkoxides, may similarly comprise polymerizable organic groups, in particular as previously defined, and/or non-polymerizable functional organic groups, in particular as previously defined.

In a first, particularly preferred embodiment, the polymeric particles comprise an inorganic-organic hybrid polymer having the following schematic general structure (I)

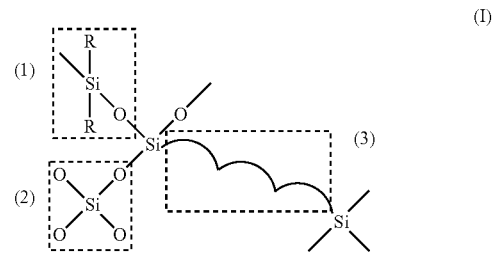

where the general structure (I) may comprise structural units (1), (2) and/or (3), where the structural unit (1) constitutes an inorganic network constituent comprising at least one radical R and/or (R) preferably bound to a silicon atom, in particular wherein the radical R and/or (R), which are identical or different, each constitutes a functional, preferably non-polymerizable organic group as previously defined;

where the structural unit (2) constitutes a constituent of the inorganic network based on crosslinked silicon alkoxides and/or based on crosslinked Si—O—Si units; and where the structural unit (3) constitutes an organic network constituent based on organic crosslinks, in particular wherein the structural unit (3) may result through organic crosslinking of polymerizable organic radicals, in particular as previously defined, each preferably bound to a silicon atom.

In a second, alternative, similarly particularly preferred embodiment, the polymeric particles comprise an inorganic-organic hybrid polymer having the following schematic general structure (II)

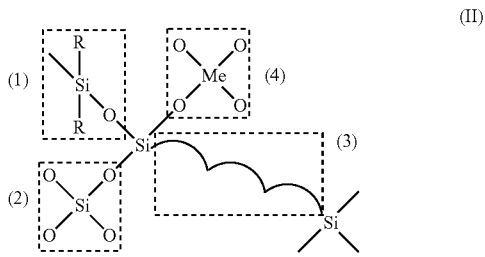

where the general structure may comprise structural units (1), (2), (3) and/or (4), where the structural units (1), (2) and (3) have the previously indicated definition and where the structural unit (4) constitutes a constituent of the inorganic network based on crosslinked metal alkoxides and/or crosslinked Me—O—Me units, in particular wherein Cu, Ag, Cd, Pt, Pd, Rh, Zn, Hg, Ti, Zr and/or Al may be used as previously recited metals (Me). The metals may constitute the catalytically active component or the catalyst.

In an embodiment which is particularly preferred in accordance with the present invention, the inorganic-organic hybrid polymers used in accordance with the present invention for the polymeric particles comprise so-called ormocers. Ormocer® is a registered trade mark of Fraunhofer Gesellschaft zur Förderung der angewandten Forschung e.V., Munich.

The inorganic-organic hybrid polymers used in accordance with the present invention, in particular the ormocers, are particularly suitable for use in the realm of the present invention, since specific choice or variation of the respective network constituents makes it possible for the physical or chemical polymer properties or parameters to be specifically controlled or set. Put more accurately, the properties of the inorganic-organic hybrid polymers, in particular of the ormocers, can be effected by means for example of the starting materials, the reaction conditions for the inorganic polycondensation reaction and also through the policing of linking reactions leading to the construction of the organic network. This makes it possible for specific inorganic-organic polymers to be custom tailored as it were—for example with regard to specific enlargements in surface area and an associated improved catalytic activity.

The specific deployment of silicon alkoxides having specific functional groups and heteroatoms or metals (for example Cu, Ag, Cd, Pt, Pd, Rh, Zn, Hg, Ti, Zr and/or Al) makes it possible in the realm of the present invention for a catalytic effect to be realized for the inorganic-organic hybrid polymer as such. Owing to the aforementioned possible variations with regard to the production of the inorganic-organic hybrid polymer, the hardness, elasticity, density, porosity, thermal expansion, polarity, structurability, sensitivity to gases and ions, etc. can be set in a specific or custom tailored manner.

As previously stated, the inorganic-organic hybrid polymers, in particular the ormocers, can be produced by means of a two-stage process. To this end, the inorganic structural units, in particular the silicon alkoxides, can be formed by hydrolysis and condensation in a first step. In a subsequent, second step the inorganic structural units and/or network constituents are polymerized and/or crosslinked to give an organic network to construct the organic structural units by polymerization and/or crosslinking particularly of the organic radicals of the silicon alkoxides, to form an inorganic-organic hybrid polymer comprising not only inorganic network constituents but also organic network constituents. The inorganic and organic structural units can be formed in a manner known to one skilled in the art. For example, the crosslinking to form the organic network can be effected using ultraviolet and/or infrared irradiation, light irradiation, free radical polymerization, etc.

As regards the introduction of the catalytically active component into the unit which is in accordance with the present invention, it may be provided in accordance with the present invention that the polymeric particles are doped or impregnated with the catalytically active component. For instance, the catalytically active component may be incorporated into the polymeric particles or inorganic-organic hybrid polymers in the course of their production, for example in the sense of a mixture or blend, or else be incorporated into the network covalently and/or ionically in the course of production. But it is similarly possible for the polymeric particles to be admixed with the catalytically active component, for example by means of coating or the like, after their production. It is similarly possible in accordance with the present invention for the catalytically active component to be physically or preferably chemically bound in and/or to the polymeric particles or in and/or to the inorganic-organic hybrid polymer, for example as previously described (as metal alkoxide for example). For instance, the catalytically active component may constitute a functional constituent or a functional group of the silicon alkoxide previously described.

The catalytically active component as such may be a substance capable of catalytically decomposing poisonous, noxiant or odorant entities; reference may be made to the above observations in this regard. Examples of catalytically active components useful in accordance with the present invention are for example and nonlimitingly enzymes or catalytically active components based on metals or metal ions or metal compounds, preferably copper, silver, cadmium, platinum, palladium, rhodium, zinc, mercury, titanium, zirconium and/or aluminum, especially their ions and/or salts. Preference in accordance with the present invention is given to the use of ions of copper, of silver, of cadmium, of platinum, of palladium, of rhodium, of zinc, of mercury, of titanium, of zirconium and/or of aluminum. Catalytically active components within the meaning of the present invention, however, also comprise acidic or basic compounds, in particular on the basis of phosphoric acid, calcium carbonate, trimethanolamine, 2-amino-1,3-propanediol or sulphur.

The amount of catalytically active component can vary within wide limits. More particularly, it can be in the range from 0.01% to 30% by weight, preferably in the range from 0.1% to 20% by weight, more preferably in the range from 1% to 15% by weight and most preferably in the range from 1% to 10% by weight, based on the weight of the polymeric particles.

The aforementioned catalysts or catalytically active components are capable of catalytically decomposing poisonous, noxiant and odorant entities in an effective manner to render them harmless. Owing to the specific deployment of these catalysts, in conjunction with previously defined inorganic-organic hybrid polymers, preferably ormocers, which have a large surface area, in particular in the form of nanoparticles used in accordance with the present invention, the present invention provides an extremely capable catalytically active unit capable of chemically decomposing toxic or odor-intensive substances, thus rendering them harmless.

The excellent catalytic performance of the catalytically active unit in accordance with the present invention can be illustrated by way of example with reference to the following reaction processes:

a) For example, hydrocyanic acid can be destroyed by means of copper catalysts in accordance with the following reaction equation:

$$Cu_2O + 2HCN \rightarrow 2CuCn + H_2O$$

b) But hydrocyanic acid can also be removed with the aid of zinc compounds:

$$ZnO + 2HCN \rightarrow Zn(CN_2) + H_2O$$

c) Chlorocyan ClCN, a nerve- and blood-damaging gas, is for example chemisorbed onto copper salts and then hydrolyzed by adsorbed water under the influence of heavy metals:

$$ClCN + 2H_2O \rightarrow NH_4Cl + CO_2$$

The ammonia forming from ammonium chloride by hydrolysis is complexed by copper salts.

d) Phosgene $COCl_2$ is sensitive to hydrolysis, particularly under the influence of metal salt catalysts (for example MeO where Me=metal); the hydrochloric acid is neutralized by the catalyst:

$$COCl_2 + H_2O \rightarrow 2HCl + CO_2$$

$$MeO + 2HCl \rightarrow MeCl_2 + H_2O$$

e) Arsenic hydride ($AsH_3$) is oxidized by atmospheric oxygen under the catalytic bonding of silver compounds:

$$2\ AsH_3 + 3\ O_2 \xrightarrow{Ag^+} As_2O_3 + 3\ H_2O$$

Depending on the planned use, it may be advantageous for the catalytically active unit to comprise an adsorbent capable of adsorbing chemical poisons in addition to the polymeric particles provided with at least one catalytically active component. Examples of suitable adsorbents include an adsorbent based on activated carbon, for example in the form of activated carbon particles or activated carbon fibers.

The adsorbent may be secured to the support material (backing material) by adhering in particular, in which case the adhesives and amounts of adhesive specified in relation to the polymeric particles can be used mutatis mutandis. As in relation to the polymeric particles, it should also be ensured with regard to the adsorbent particles that the adsorbent particles are accessible for gases to an extent of at least 50%, in particular to an extent of at least 60% and preferably to an extent of at least 70%.

The activated carbon may consist for example of discrete particles of activated carbon, preferably in granule form ("granulocarbon"). In this case, the average diameter of the particles of activated carbon is preferably less than 1.0 mm, especially less than 0.8 mm and preferably less than 0.6 mm, but in general is at least 0.1 mm. In accordance with this embodiment, the particles of activated carbon are applied atop the support material (backing material) in an amount of 5 to 500 g/m$^2$, in particular 10 to 400 g/m$^2$, preferably 20 to 300 g/m$^2$, more preferably 25 to 250 g/m$^2$, even more preferably 50 to 150 g/m$^2$ and most preferably 50 to 100 g/m$^2$. Useful particles of activated carbon have an internal surface area (BET) of at least 800 m$^2$/g, in particular of at least 900 m$^2$/g, preferably of at least 1000 m$^2$/g and more preferably in the range from 800 to 2500 m$^2$/g. Granulocarbon, in particular spherocarbon, has the decisive advantage that it is enormously abrasion resistant and very hard, which is very important with regard to the anti-wear properties. Preferably, the bursting pressure for an individual particle of activated carbon, in particular activated carbon granule or spherule, is at least 5 newtons, in particular at least 10 newtons, and can be up to 20 newtons.

In an alternative embodiment, the catalytic unit of the present invention, in particular the support material (backing material), may be provided or invested with activated carbon fibers, in particular in the form of an activated carbon sheet material. Such activated carbon sheet materials may have for example a basis weight in the range from 10 to 300 g/m$^2$, in particular in the range from 20 to 200 g/m$^2$ and preferably in the range from 30 to 150 g/m$^2$. The activated carbon sheet material may be for example a to woven, loop-formingly knitted, laid or composite fabric of activated carbon, in particular based on carbonized and activated cellulose and/or a carbonized and activated acrylonitrile.

It is similarly also possible to combine activated carbon particles and activated carbon fibers with one another. Activated carbon particles have the advantage of higher adsorptive capacity, while activated carbon fibers possess superior adsorption kinetics.

To increase the adsorptive efficiency or performance, it is possible for the adsorbents to be likewise impregnated with at least one catalyst. Useful catalysts in accordance with the present invention are the aforementioned substances for example. The amount of catalyst can vary within wide limits; in general, it is in the range from 0.05% to 12% by weight, preferably in the range from 1% to 10% by weight and more preferably in the range from 2% to 8% by weight, based on the weight of the adsorbent.

The advantage of the present invention's combination of adsorption-capable particles or adsorbents on the one hand and of the catalytically active component (i.e. polymeric particles comprising a catalytically active component) on the other is that these respective constituents mutually amplify each other with regard to the removal of warfare agent, poisonous, odorant and/or noxiant entities. The catalytically active component decomposes a portion of the noxiants, so that the activated carbon has to face less of an adsorptive challenge. On the other hand, the adsorption by the activated carbon obviates an overloading of the catalytically active component with the substances to be removed, so that altogether in a surprisingly synergistic manner poisonous, warfare agent, odorant and noxiant entities can be eliminated, so that this embodiment provides altogether an extremely capable system for removing such substances.

In one particular embodiment of the present invention, as previously stated, the adsorbent capable of adsorbing chemical poisons, in particular the activated carbon, preferably the activated carbon particles and/or activated carbon fibers, may serve as backing particles for the polymeric particles, in which case the polymeric particles are fixed to or applied atop the adsorbents, for example by spraying with dispersions, impregnating, etc., as previously described, and the adsorbents are in turn applied atop the support material (backing material) or secured thereto.

The present invention's catalytically active unit as such has numerous advantages, of which the present ones are to be specified purely by way of example:

- The catalytically active unit of the present invention combines a low basis weight with a large catalytic activity, also ensured by the large surface area in a smaller volume of the polymeric particles used in accordance with the present invention, in particular the polymeric nanoparticles.
- The catalytically active components may for example be directly incorporated in the polymers in the course of their production, obviating the need for a subsequent, costly and inconvenient providing of the catalytically active unit with the catalytically active component. The chemical and/or physical bond to the polymeric particles in particular ensures that the catalyst is firmly bound or fixed to the support material (backing material), so that the catalytically active unit of the present invention is very durable or robust.
- The catalytically active unit of the present invention is notable for excellent catalytic activity with regard to noxiant, poisonous or odorant entities to be removed. Owing to the specifically settable catalytic properties due to the individual end-iteming of the catalysts, the catalytically active unit of the present invention is useful for catalytic elimination or decomposition of a large number of noxiant, poisonous and odorant entities and thus has almost universal utility.
- With regard to the nature of the catalyst, the catalytically active component is quasi inexhaustible, so that the catalytic unit of the present invention can be used for a very long period without drop in activity. Therefore, the catalytic unit of the present invention is by virtue of its very long service life extremely cost-effective, since it does not have to be replaced frequently.
- The protective function with regard to noxiant, poisonous and odorant entities can be improved through the additional presence of adsorption-capable material, such as activated carbon, in which case there is even a synergistic effect in this regard, since—as previously described—the catalytically active component on the one hand and the adsorbent on the other complement each other optimally in terms of their effect.
- In accordance with the present invention, there is no need for any activated carbon present to be additionally impregnated with catalysts, so that this inconvenient and cost-intensive operation can be omitted, since the catalytically active component is already present; in addition, any impregnating of the activated carbon itself is often associated with a clogging or plugging of the micropores in the activated carbon, and this can lead to a significant drop in the activity of the activated carbon.

The present invention further provides in a second aspect of the present invention for the use of the present invention's catalytically active unit for manufacturing protective materials of any kind, in particular protective clothing, in particular for the civilian or military sector, such as protective suits, protective gloves, protective footwear, protective socks, head protective clothing and the like, and protective covers of any kind, preferably all aforementioned protective materials for NBC deployment. The protective materials manufactured using the catalytically active unit of the present invention combine a high protective function against noxiant, poisonous and odorant entities with a high wear comfort, since the catalytically active unit of the present invention can be configured to be highly air and water vapor pervious.

A third aspect of the present invention provides for the use of the present invention's catalytically active unit for manufacturing filters and filtering materials of any kind, in particular for removing noxiant, odorant and poisonous entities of any kind, in particular from air and/or gas streams, in particular NBC protective mask filters, odor filters, sheet filters, air filters, filters for indoor air purification, adsorption-capable supporting or backing structures and filters for the medical sector.

A fourth aspect of the present invention provides protective materials of any kind, in particular protective clothing, in particular for the civilian or military sector, such as protective suits, protective gloves, protective footwear, protective socks, head protective clothing and the like, and protective covers of any kind, preferably all aforementioned protective materials for NBC deployment, manufactured using the catalytically active unit according to the present invention and/or comprising the catalytically active unit according to the present invention.

A further aspect of the present invention finally provides filters and filtering materials of any kind, in particular for removing noxiant, odorant and poisonous entities of any kind, in particular from air and/or gas streams, such as NBC protective mask filters, odor filters, sheet filters, air filters, in particular filters for indoor air purification, adsorption-capable supporting or backing structures and filters for the medical sector, manufactured using the catalytically active unit according to the present invention or comprising the catalytically active unit according the present invention.

Further embodiments, modifications and variations of the present invention will become apparent to and realizable by the ordinarily skilled after reading the description without their having to go outside the realm of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A catalytically active unit, the catalytically active unit comprising a support material in the form of a sheet-like construction comprising a textile fabric,
   the support material being provided with polymeric nanoparticles,
   the polymeric nanoparticles having a diameter in the range of from 1 am to 1,000 nm and comprising at least one catalytically active component selected from the group consisting of metals, metal ions and metal salts and mixtures thereof and the catalytic active compound being chemically or physically bound to the polymeric nanoparticles,
   wherein the polymeric nanoparticles are silicate-based ceramic nanoparticles and comprise at least one inorganic-organic hybrid polymer comprising both organic structural units and inorganic structural units comprising an inorganic silicatic network based on silicon alkoxides comprising Si—O—Si units.

2. The catalytically active unit according to claim 1, wherein the support material has a basis weight in the range of from 25 to 500 g/m².

3. The catalytically active unit according to claim 1, wherein the support material is gas-pervious, water-pervious and water-vapor pervious.

4. The catalytically active unit according to claim 1, wherein the support material is gas-impervious and water-impervious but water-vapor pervious.

5. The catalytically active unit according to claim 1, wherein the polymeric nanoparticles have a diameter in the range of from 100 nm to 500 nm.

6. The catalytically active unit according to claim 1, wherein the polymeric nanoparticles are fixed to the support material.

7. The catalytically active unit according to claim 1, wherein the polymeric nanoparticles are applied to the support material in an amount of from 5 to 500 g/m².

8. The catalytically active unit according to claim 7, wherein the polymeric nanoparticles are applied to the support material in an amount of from 50 to 200 g/m².

9. The catalytically active unit according to claim 1, wherein the inorganic-organic hybrid polymer comprises ormocers.

10. The catalytically active unit according to claim 1, wherein the inorganic-organic hybrid polymer, apart from silicon alkoxides, additionally comprises metals and/or heteroatoms.

11. The catalytically active unit according to claim 1, wherein the inorganic-organic hybrid polymer, apart from silicon alkoxides, additionally comprises, metal alkoxides, the metal being selected from the group consisting of copper, silver, cadmium, platinum, palladium, rhodium, zinc, mercury, titanium, zirconium and aluminum and mixtures thereof.

12. The catalytically active unit according to claim 1, wherein the metal is selected from the group consisting of copper, silver, cadmium, platinum, palladium, rhodium, zinc, mercury, titanium, zirconium and aluminum and mixtures thereof.

13. The catalytically active unit according to claim 1, wherein the amount of catalytically active component is in the range of from 0.01% to 30% by weight, based on the weight of the polymeric nanoparticles.

14. The catalytically active unit according to claim 1, wherein the catalytically active unit further comprises an adsorbent capable of adsorbing chemical poisons, the adsorbent being based on activated carbon.

15. A catalytically active unit, the catalytically active unit comprising a support material in the form of a sheet-like construction comprising a textile fabric,
the support material being provided with polymeric nanoparticles,
the polymeric nanoparticles having a diameter in the range of from 1 nm to 1,000 nm and comprising at least one catalytically active component selected from the group consisting of metals, metal ions and, metal salts and mixtures thereof and the catalytic active compound being chemically or physically bound to the polymeric nanoparticles,
wherein the polymeric nanoparticles are silicate-based ceramic nanoparticles and comprise at least one inorganic-organic hybrid polymer comprising both organic structural units and inorganic structural units comprising an inorganic silicatic network based on silicon alkoxides comprising Si—O—Si units
wherein the catalytically active unit further comprises an absorbent capable of adsorbing chemical poisons.

16. The catalytically active unit according to claim 15, wherein the adsorbent capable of adsorbing chemical poisons are activated carbon particles.

* * * * *

UNITED STATES PATENT AND TRADEMARK OFFICE
CERTIFICATE OF CORRECTION

PATENT NO. : 7,759,274 B1  Page 1 of 1
APPLICATION NO. : 11/475669
DATED : July 20, 2010
INVENTOR(S) : Bertram Bohringer It is certified that error appears in the above-identified patent and that said Letters Patent is hereby corrected as shown below:

Title page, item [56] col. 1, lines 4-5 under References cited, patent publication; documents 2003/0038083 to Schiestel et al. and 2004/0009726 to Axtell et al., remove the "*" designation.

Signed and Sealed this

Thirty-first Day of August, 2010

David J. Kappos
*Director of the United States Patent and Trademark Office*